(12) United States Patent
Ide

(10) Patent No.: US 6,701,337 B1
(45) Date of Patent: Mar. 2, 2004

(54) FLOATING-POINT CALCULATOR

(75) Inventor: Nobuhiro Ide, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 551 days.

(21) Appl. No.: 09/584,748

(22) Filed: Jun. 1, 2000

(30) Foreign Application Priority Data

Jun. 2, 1999 (JP) .......................................... 11-155174

(51) Int. Cl.[7] .............................. G06F 7/00; G06F 7/38
(52) U.S. Cl. ...................................... 708/501; 708/603
(58) Field of Search ................................ 708/495, 501, 708/505, 507, 514, 603

(56) References Cited

U.S. PATENT DOCUMENTS

| 4,839,846 A | 6/1989 | Hirose et al. | |
| 5,359,548 A | * 10/1994 | Yoshizawa et al. | 708/505 |
| 6,038,582 A | * 3/2000 | Arakawa et al. | 708/501 |
| 6,363,476 B1 | * 3/2002 | Ide | 712/222 |

* cited by examiner

*Primary Examiner*—Chuong Dinh Ngo
(74) *Attorney, Agent, or Firm*—Oblon, Spivak, McClelland, Maier & Neustadt, P.C.

(57) ABSTRACT

A floating-point calculator includes an exponent part calculator device which executes subtraction by sequentially combining exponents of a plurality of operands, and obtains subtraction result exponents of respective combinations to be used as alternatives for the number of digits for digit adjustment of fixed-point parts of the operands and carries of the subtraction, respectively;

a maximum value selector device responsive to values of said carries to select one of said exponents of said operands having the maximum value; a digit adjustment object selector device responsive to values of the carries to select a fixed-point part of the operand to be adjusted in digit; and a digit adjustment number-of-digits selector device responsive to values of the carries to select the subtraction result exponent to be used as the number of digits for digit adjustment of the fixed-point part of the operand to be adjusted in digit.

7 Claims, 9 Drawing Sheets

| MAXIMUM VALUE | CARRYS' VALUE Cab Cbc Cca | | | SELECT LOGIC | SELECTED VALUE S1 S2 f1 f2 f3 | | | | |
|---|---|---|---|---|---|---|---|---|---|
| ea | 0 | 1 | 1 | $\overline{\text{Cab}}$ and Cca | Dca | Dab | fa | fb | fc |
| | 0 | 0 | 1 | | | | | | |
| eb | 1 | 0 | 1 | Cab and $\overline{\text{Cbc}}$ | Dab | Dbc | fb | fc | fa |
| | 1 | 0 | 0 | | | | | | |
| ec | 1 | 1 | 0 | Cbc and $\overline{\text{Cca}}$ | Dbc | Dca | fc | fa | fb |
| | 0 | 1 | 0 | | | | | | |

FIG. 4

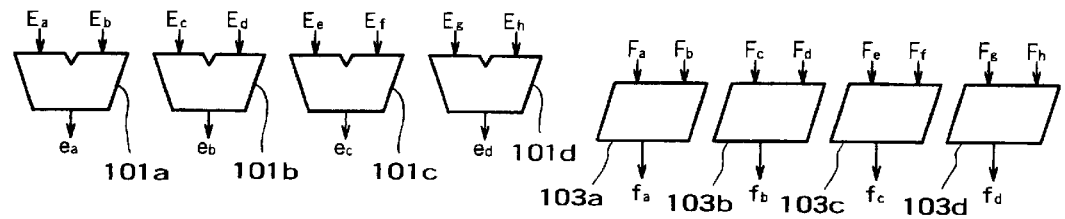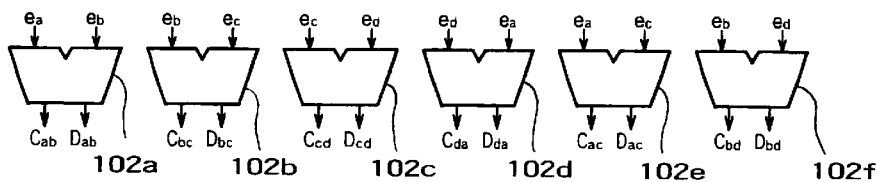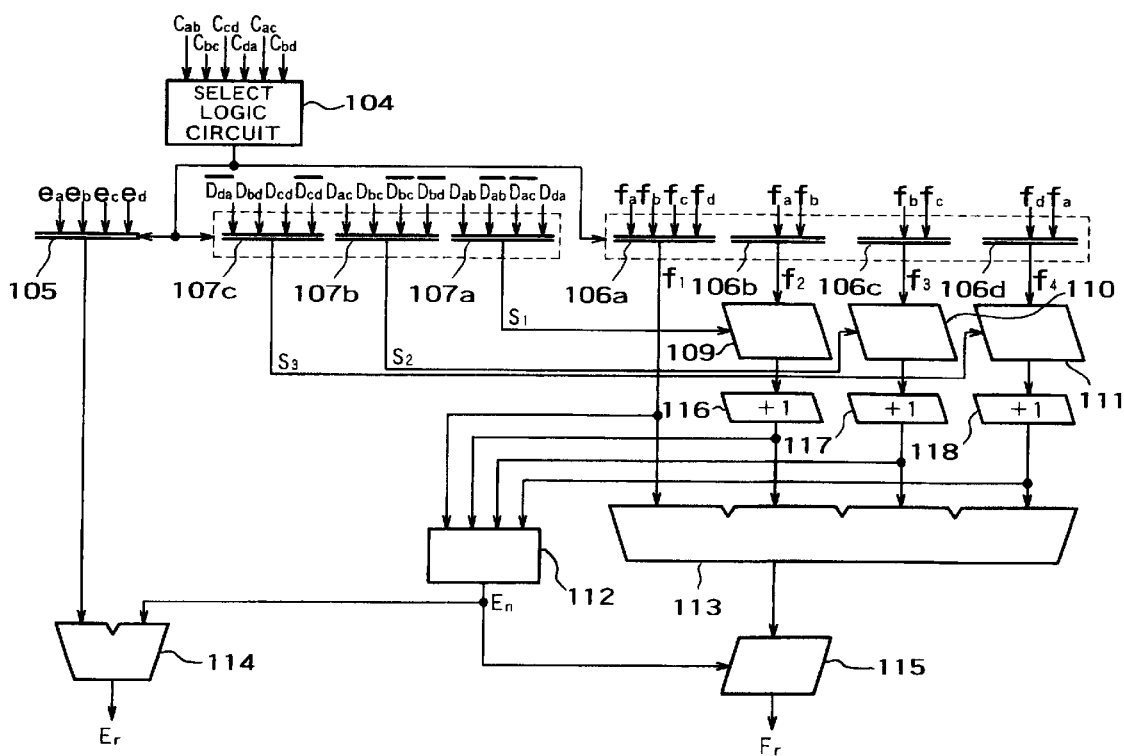
FIG. 6

| MAXIMUM VALUE | CARRYS' VALUE Cab Cbc Ccd Cda Cac Cbd | SELECT LOGIC | SELECTED VALUE S1 S2 S3 f1 f2 S3 S4 |
|---|---|---|---|
| $e_a$ | 0 0 0 0 0 0<br>0 0 0 0 0 1<br>0 0 0 1 0 0<br>0 0 0 1 0 1<br>0 0 0 1 1 0<br>0 0 0 1 1 1 | $\overline{Cab}$ and Cda and $\overline{Cbd}$ | Dab Dac $\overline{Dda}$ fa fb fc fd |
| $e_b$ | 1 0 0 0 0 0<br>1 0 0 0 0 1<br>1 0 0 0 1 0<br>1 0 0 0 1 1<br>1 0 0 1 0 0<br>1 0 0 1 0 1 | Cab and $\overline{Cbc}$ and $\overline{Cac}$ | $\overline{Dab}$ Dbc Dbd fb fa fc fd |
| $e_c$ | 0 1 0 0 0 1<br>0 1 0 0 1 0<br>0 1 0 0 1 1<br>1 1 0 0 0 1<br>1 1 0 0 1 0<br>1 1 0 0 1 1 | Cbc and $\overline{Ccd}$ and Cbd | $\overline{Dac}$ $\overline{Dbc}$ Dcd fc fa fb fd |
| $e_d$ | 0 0 1 0 0 0<br>0 0 1 0 0 0<br>0 0 1 1 0 1<br>1 1 1 0 0 1<br>1 1 1 0 0 1<br>1 0 1 0 0 1 | Ccd and $\overline{Cda}$ and Cac | Dda $\overline{Dbd}$ $\overline{Dcd}$ fd fa fb fc |

FIG. 7

FLOATING-POINT CALCULATOR

BACKGROUND OF THE INVENTION

1. Field of the Invention

This invention relates to a floating-point calculator, and more particularly, to a floating-point calculator having three or more inputs.

2. Related Background Art

In three-dimensional computer graphics (3DCG), various kinds of computation are conducted to generate images. Especially in a phase of geometry arithmetic processing which is the phase of various kinds of processing such as movement of three-dimensional models, three-dimensional and four-dimensional matrix operations are executed frequently. Matrix operation is ascribed to operation of inner products, such as a×a+b×b+c×c and a×b+c×d+e×f, for example. Therefore, along with the progress of the speed of 3DCG processing, there is a demand for technologies capable of high-speed operation of inner products.

FIG. 1 is a block diagram showing a first configuration example of conventional floating-point calculators. This floating-point calculator is configured to execute operation of A+B×C of three operands A, B and C. Let exponents of these three operands A, B, C be Ea, Eb, Ec, and let their fixed-point parts be Fa, Fb and Fc. Inner products can be calculated by repeating the operation A+B×C.

The conventional floating-point calculator shown in FIG. 1 includes: an adder 201 for adding the exponent Eb of the operand B and the exponent Ec of the operand C and obtaining an exponent Em of the result of multiplication B×C of the operands B, C; a subtracter 202 for subtracting the exponent Em from the exponent Ea and obtaining an exponent Ed for digit adjustment of the fixed-point part Fa; a selecting circuit 203 selecting one of the exponents Ea and Em having a larger value; a digit adjusting shifter 204 for calculating a fixed-point part Fsf adjusted in digit from the fixed-point part Fa, based on the exponent Ed; a multiplier 205 for conducting multiplication Fb×Fc of fixed-point parts Fb and Fc and obtaining a sum component fixed-point part Fs and a carry component fixed-point part Fcr; a preceding zero detecting circuit 206 for counting the number of preceding zeros resulting from the addition Fsf+Fs+Fcr of the fixed-point parts Fsf, Fs and Fcr and obtaining an exponent correction value En for normalization of the operation result; an adder 207 for calculating a fixed-point part Fad resulting from the addition Fsf+Fs+Fcr of the fixed-point parts Fsf, Fs and Fcr; a subtracter 208 for subtracting the exponent correction value En from one of the exponents Ea and Em having a larger value and obtaining an exponent Er of a normalized operation result; and a normalization shifter 209 for conducting a digit adjustment for normalization of the fixed-point part Fad on the basis of the exponent correction value En and obtaining a fixed-point part Fr as an operation result.

The conventional floating-point calculator shown in FIG. 1 operates as explained below.

When exponents Ea, Eb, Ec and fixed-point parts Fa of three operands A, B, C are input, addition Eb+Ec of the exponents Eb and Ec are conducted by the adder 201 first, the exponent Em of the result of multiplication B×C of the operands B and C is obtained, and the exponents Em and Ea are input to the subtracter 202 and the selecting circuit 203. In the subtracter 202, subtraction *Ea–Em* of the exponents Ea and Em is conducted, and the exponent Ed for digit adjustment of the fixed-point part Fa is obtained. On the other hand, in the selecting circuit 203, one of the exponents Ea and Em having a larger value is selected. The fixed-point part Fa and the component Ed are input to the digit adjustment shifter 204. In the digit adjustment shifter 204, digit adjustment of the fixed-point part Fa is conducted based on the exponent Ed, and the fixed-point part Fsf is obtained. On the other hand, in the multiplier 204, multiplication Fb×Fc of the fixed-point parts Fb and Fc is conducted, and the result of the multiplication is calculated separately for the sum component fixed-point part Fs and for the carry component fixed-point part Fcr. These fixed-point parts Fsf, Fs and Fcr are input to the preceding zero detecting circuit 206 and the adder 207. In the preceding zero detecting circuit 206, addition Fsf+Fs+Fcr of the fixed-point parts Fsf, Fs and Fcr is conducted, the number of preceding zeros in the result of the addition is counted, and the exponent correction value En for normalization of the operation result is calculated. In the adder 207, addition Fsf+Fs+Fcr of the fixed-point parts Fsf, Fs and Fcr is conducted, and the fixed-point part Fad is obtained as the result of the addition. One of the exponents Ea and Em having a larger value and the exponent correction value En are input to the adder 208, and the fixed-point part Fad and the exponent correction value En are input to the digit adjusting shifter 209. In the subtracter 208, digit adjustment for normalization of the fixed-point part Fad is conducted based on the exponent correction value En, and the fixed-point part Fr is obtained as the result of operation. Obtaining the exponent Er and the fixed-point part Fr means obtaining the result of operation A+B×C. Inner products in a matrix operation are obtained by repeating these operations.

FIG. 2 is a block diagram showing a second configuration example of conventional floating-point calculator. This floating-point calculator is configured to execute operation A×B+C×D+E×F of six operands A, B, C, D, E and F. Let exponents of six operands A, B, C, D, E and F be Ea, Eb, Ec, Ed, Ee and Ef, and let their fixed-point parts be Fa, Fb, Fc, Fd, Fe and Ff. Three-dimensional inner products can be obtained at the same time by executing the operation A×B+C×D+E×F.

The conventional floating-point calculator shown in FIG. 2 includes: an adder 301a for adding the exponent Ea of the operand A and the exponent Eb of the operand B, and obtaining an exponent ea as the result of multiplication A×B of the operands A and B; an adder 301b for adding the exponent Ec of the operand C and the exponent Ed of the operand D, and obtaining an exponent eb as the result of multiplication C×D of the operands C and D; and adder 301c for adding the exponent Ee of the operand E and the exponent Ef of the operand F, and obtaining an exponent ec as the result of multiplication E×F of the operands E and F; a maximum value detecting circuit 302 for detecting the maximum value of the exponents ea, eb and ec calculated by the adders 301a, 301b and 301c; a subtracter 303a for subtracting the maximum value of the exponents ea, eb and ec from the exponent ea, and obtaining the number of digits for digit adjustment; a subtracter 303b for subtracting the maximum value of the exponents ea, eb and ec from the exponent eb, and obtaining the number of digits for digit adjustment; a subtracter 303c for subtracting the maximum value of the exponents ea, eb and ec from the exponent ec, and obtaining the number of digits for digit adjustment; a multiplier 302a for multiplying the fixed-point part Fa of the operand A and the fixed-point part Fb of the operand B and obtaining the multiplication result fa; a multiplier 304b for multiplying the fixed-point part Fc of the operand C and the fixed-point part Fd of the operand D to obtain the multiplication result fb; a multiplier 304c for multiplying the fixed-point part Fe of the operand E and the fixed-point part Ff of the operand F to obtain the multiplication result fc; a digit adjusting shifter 305a for digit adjustment of the operation result fa of the multiplier 304a, based on the operation result of the subtracter 303a; a digit adjusting shifter 305b for digit adjustment of the operation result fb of the multiplier 304b, based on the operation result of the subtracter 303b; a digit adjusting shifter 305c for digit adjustment of the operation result fc of the multiplier 304c, based on the operation result of the subtracter 303c; a preceding zero detecting circuit 306 for counting the number of preceding zeros in the results of addition fa, fb and fc adjusted in digit and obtaining an exponent correction value En for normalization of operation results; an adder 307 for adding fa, fb and fc adjusted in digit; a subtracter 308 for subtracting the exponent correction value En from the maximum value of the exponents ea, eb and ec, and obtaining an exponent Er of a normalized operation result; and a normalization shifter 309 which executes digit adjustment of the result of the addition by the adder 307, based on the exponent correction value En, and obtaining a fixed-point part Fr of the result of operation.

The floating-point calculator shown in FIG. 2 operates as explained below.

When the exponents Ea, Eb, Ec, Ed, Ed and Ef of six operands A, B, C, D, E and F, and their fixed-point parts Fa, Fb, Fc. Fd, Fe and Ff are input, the adders 301a, 301b and 301c conduct addition Ea+Eb of the exponents Ea and Eb, addition Ec+Ed of the exponents Ec and Ed, and addition Ee+Ef of the exponents Ee and Ef, respectively, and produce an exponent ea of the result of multiplication A×B of the operands A and B, exponent eb as the result of multiplication C×D of the operands C and D, and exponent ec as the result of multiplication E×F of the operands E and F. Once the exponents ea, eb and ec are produced by the adders 301a, 301b and 301c, the maximum value is detected from the exponents ea, eb and ec by the maximum value detecting circuit 302. Detection of the maximum value by the maximum value detecting circuit 302 is performed by comparing all combinations of two numbers among three exponents ea, eb and ec. Subsequently, the maximum value of the exponents ea, eb and ec is subtracted from the exponents ea, eb, ec, respectively, by the subtracters 303a, 303b and 303c, and numbers of digits for digit adjustment are obtained, respectively. On the other hand, the multipliers 304a, 304b and 304c conduct multiplication Fa×Fb of the fixed-point parts Fa and Fb of the operands A and B, multiplication Fc×Fd of the fixed-point parts Fc and Fd of the operands C and D, and multiplication Fe×Ff of the fixed-point parts Fe and Ff of the operands E and E, respectively, and produce multiplication results fa, fb and fc, respectively. Then, the digit adjusting shifter 305a, 305b and 305c conducts digit adjustment of the operation results fa, fb and fc of the multipliers 304a, 304b and 304c on the basis of the operation results of the subtracters 303a, 303b and 303c. After digit adjustment of the operation results fa, fb and fc, the preceding zero detecting circuit 306 counts the number of preceding zeros in the addition results fa, fb and fc adjusted in digit, and produces an exponent correction value En for normalization of operation results. On the other hand, the adder 307 conducts addition of fa, fb and fc after digit adjustment. Finally, the subtracter 308 subtracts the exponent correction value En from the maximum value among the exponents ea, eb and ec to thereby produce an exponent Er of a normalized operation result, and the normalization shifter 309 conducts digit adjustment for normalization of the addition result of the adder 307 on the basis of the exponent correction value En thereby to produce a fixed-point part as an operation result. Having produced the exponent Er and the fixed-point part Fr means that the operation result of A×B+C×D+E×F. Therefore, three-dimensional inner products can be obtained at the same time by execution of this operation A×B+C×D+E×F.

However, in the conventional floating-point calculator shown in FIG. 1 as the first configuration example, since operation of inner products is conducted by repeating addition and multiplication, there was the problem that subsequent operation processing depended upon precedent operation results and it took a time to repeat the processing.

In the conventional floating-point calculator shown in FIG. 1 as the second configuration example, since detection of the maximum value among three exponents ea, eb and ec by the maximum value detecting circuit 302 is conducted by comparing all combination of two numbers among three exponents ea, eb and ec, there was the problem that a lot of hardware resources and processing time were required. Additionally, since the number of digits for digit adjustment was calculated after calculation of the maximum value, the processing speed was low, and digit adjusting shifters for fixed-point parts as many as the number of operands were required. Also in this respect, a lot of hardware resources were required.

SUMMARY OF THE INVENTION

It is therefore an object of the invention to provide a floating-point calculator having configuration which enables reduction of hardware resources and improvement of the processing speed.

According to the present invention, there is provided a floating-point calculator including an exponent part calculator device which executes subtraction by sequentially combining exponents of a plurality of operands, and obtains subtraction result exponents of respective combinations to be used as alternatives for the number of digits for digit adjustment of fixed-point parts of the operands and carries of the subtraction, respectively; a maximum value selector device responsive to values of the carries to select one of the exponents of the operands having the maximum value; a digit adjustment object selector device responsive to values of the carries to select a fixed-point part of the operand to be adjusted in digit; and a digit adjustment number-of-digits selector device responsive to values of the carries to select the subtraction result exponent to be used as the number of digits for digit adjustment of the fixed-point part of the operand to be adjusted in digit. In the above mentioned floating-point calculator according to the present invention, since the floating-point calculator according to the invention is configured to obtain the maximum value of exponents of a plurality of operands by using a carry obtained as a result of subtraction combining exponents of a plurality of operands, its select logic is simplified. Further, since digit adjustment shifting can be executed just after a result of the select logic is obtained, the operation speed can be increased, and the hardware resources can be reduced.

According to the present invention in the detailed configuration, there is provided a floating-point calculator including an exponent part adder device which sequentially executes subtraction of every combined two of exponents of a plurality of operands, and obtains subtraction result exponents of respective combinations; a fixed-point part multiplier device which sequentially executes multiplication of every combined two of fixed-point parts of the operands and obtains multiplication result fixed-point parts of respective combinations; an exponent part subtracter device which executes the addition result exponents by sequentially combining them and obtains subtraction result exponents of respective combinations to be used as alternatives for the number of digits for digit adjustment of the multiplication result fixed-point parts and carries of the subtraction, respectively; a maximum value selector device responsive to values of the carries to select one of the addition result exponents having the maximum value; a digit adjustment object selector device responsive to values of the carries to select the multiplication result fixed-point part to be adjusted in digit; a digit adjustment number-of-digits selector device responsive to values of the carries to select the subtraction result exponent to be used as the number of digits for digit adjustment of the multiplication result fixed-point part to be adjusted in digit; a digit adjuster device for digit adjustment of the multiplication result fixed-point part by using selected the subtraction result component; a fixed-point part adder device for executing addition of the multiplication result fixed-point parts adjusted in digit to obtain an addition result fixed-point part; a preceding zero detector device for executing addition of the multiplication result fixed-point parts adjusted in digit, then counting the number of preceding zeros in the addition result fixed-point part obtained, and obtaining a normalization exponent for normalization of the operation result; a normalization operation result exponent calculator device for subtracting the normalization exponent from one of the addition result exponents having the maximum value, and obtaining a normalized operation result exponent; and a normalization operation result fixed-point part calculator device responsive to the normalization exponent to perform digit adjustment for normalization of the addition result fixed-point part and obtaining an operation result fixed-point part.

Further details of the configuration of the floating-point calculator according to the invention will be explained later.

BRIEF DESCRIPTION OF THE DRAWINGS

FIG. 4 is a table showing a select logic of a select logic circuit 104 in the floating-point calculator according to the invention shown in FIG. 3;

FIG. 6 is a block diagram showing configuration of a floating-point calculator taken as another embodiment of the invention;

FIG. 7 is a table showing a select logic of a select logic circuit 104 in the floating-point calculator according to the invention shown in FIG. 6;

DESCRIPTION OF THE PREFERRED EMBODIMENTS

Explained below is a floating-point calculator taken as an embodiment of the invention with reference to the drawings.

Figure 3:
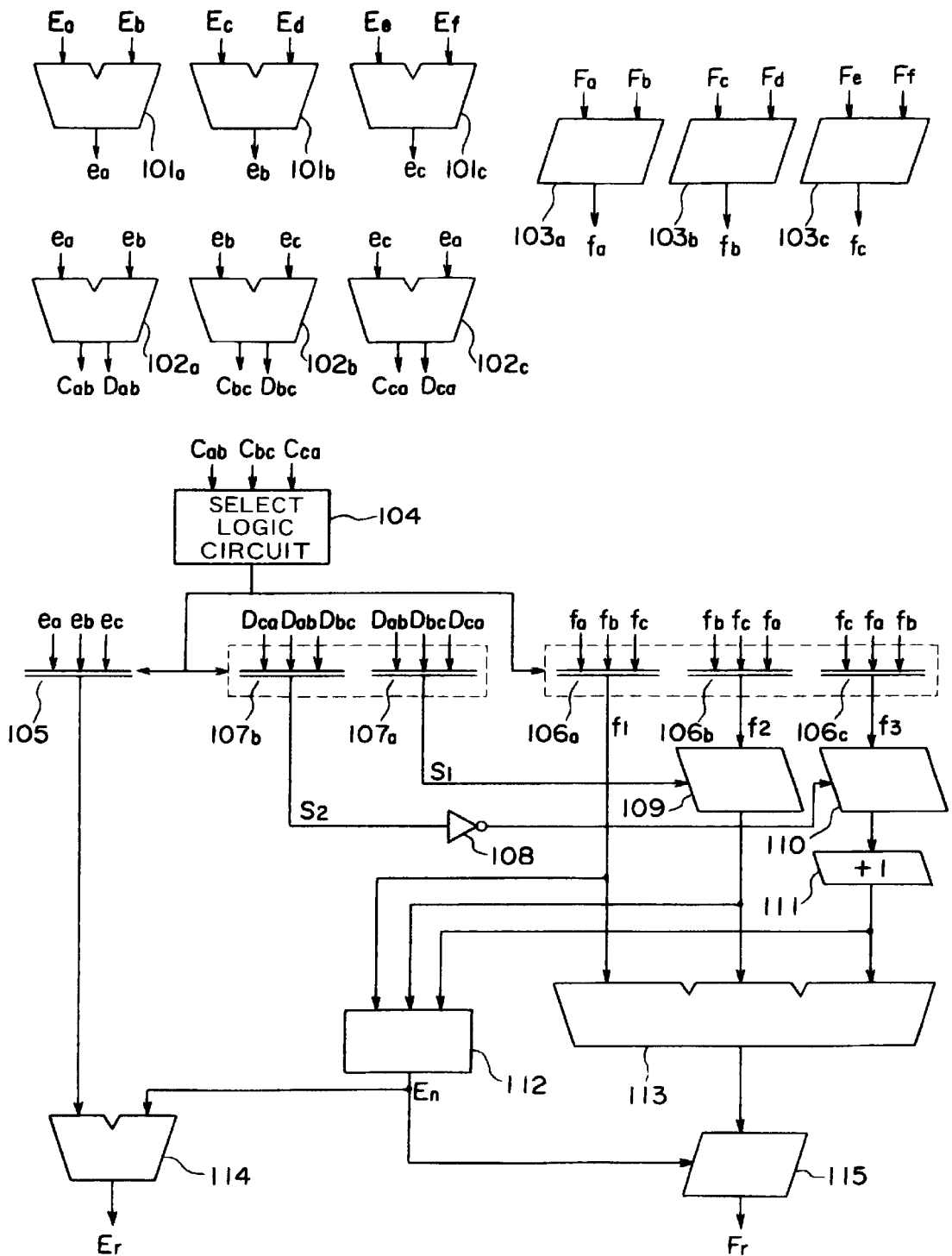
FIG. 3 is a block diagram showing configuration of a floating-point calculator taken as an embodiment of the invention.

FIG. 3 is a block diagram showing configuration of a floating-point calculator taken as an embodiment of the invention. The floating-point calculator according to the invention is configured to execute operation A×B+C×D+E×F of six operands A, B, C, D, E and F more quickly by using less hardware resources. Let these six operands A, B, C, Dm E and F have exponents Ea, Eb, Ec, Ed, Ee, Ef, and fixed-point parts Fa, Fb, Fc, Fd, Fe and Ef, respectively. Three-dimensional inner products can be obtained at the same time by executing this operation A×B+C×D+E×F.

The floating-point calculator according to the invention shown in FIG. 3 includes: an adder 101a for adding the exponent Ea of the operand A and the exponent Eb of the operand B, and obtaining an exponent ea of the result of multiplication A×B of the operands A and B; an adder 101b for adding the exponent Ec of the operand C and the exponent Ed of the operand D, and obtaining an exponent eb of the result of multiplication C×D of the operands C and D; and adder 101c for adding the exponent Ee of the operand E and the exponent Ef of the operand F, and obtaining an exponent ec of the result of multiplication E×D of the operands E and F; a subtracter 102a for subtracting the exponent eb from the exponent ea and calculating its subtraction result Dab and a carry Cab; a subtracter 102b for subtracting the exponent ec from the exponent eb and obtaining its subtraction result Dbc and a carry Cbc; a subtracter 102c for subtracting the exponent ea from the exponent ec and obtaining its subtraction result Dca and a carry Cca; a multiplier 103a for multiplying the fixed-point part Fa of the operand A and the fixed-point part Fb of the operand B, and obtaining its multiplication result fa; a multiplier 103b for multiplying the fixed-point part Fc of the operand C and the fixed-point part Fd of the operand D, and obtaining its multiplication result fb; a multiplier 103c for multiplying the fixed-point part Fe of the operand E and the fixed-point part Ff of the operand F, and obtaining its multiplication result fc; a select logic circuit 104 for generating a select signal for selecting the maximum value from the exponents ea, eb and ec and selectively carrying the multiplication results fa, fb and fc by the multipliers 103a, 103b and 103c on the basis of the carries Cab, Cbc and Cca obtained by subtraction by the subtracters 103a, 103b and 103c; a maximum value selecting circuit 105 responsive to the select signal from the select logic circuit 104 to select the maximum value from the exponents ea, eb and ec; carry object selecting circuits 106a, 106b and 106c for selecting the multiplication results fa, fb and fc by the multipliers 103a, 103b and 103c as selective carry object fixed-point parts f1, f2 and f3 sequentially from one having the largest number of digits on the basis of the select signal from the select logic circuit 104; number-of-digits selecting circuits 107a and 107b for selecting numbers of digits S1 and S2 for selective carry for a selective carry object fixed-point part whose number of digits is the second from the largest one and a selective carry object fixed-point part whose number of digits is the third from the largest one among f1, f2 and f3, from Dab, Dbc and Dca, on the basis of the select signal from the select logic circuit 104; an inverter 108 for inverting the negative number of digits S2 selected by the number-of-digits selecting circuit 107b to change it to the complement on 2; a digit adjusting shifter 109 for carrying the number of digits of the selective carry object fixed-point part f2 selected by the carry object selecting circuit 106b by the number of digits S1 selected by the number-of-digits selecting circuit 107a; a digit adjusting shifter 110 for carrying the number of digits of the selective carry object fixed-point part f3 selected from the carry object selecting circuit 106c by the number of digits obtained by inverting the negative number of digits S2 selected by the number-of-digits selecting circuit 107a to change it into the complement on 2; a shifter 111 for shifting the number of digits of the selective carry object fixed-point part f3 after digit adjustment to the right by 1; a preceding zero detecting circuit 112 for counting the number of preceding zeros in the addition result of the selective carry object fixed-point parts f1, f2 and f3 after digit adjustment, and obtaining an exponent correction value En for normalization of operation results; an adder 113 for effecting addition of the selective carry object fixed-point parts f1, f2 and f3 after digit adjustment; a subtracter 114 for subtracting the exponent correction value En from the maximum value of the exponents ea, eb and ec, and obtaining an exponent Er of a normalized operation result; and a normalization shifter 115 for effecting digit adjustment for normalization of the addition result of adder 113 and obtaining a fixed-point part Fr as the operation result.

FIG. 4 is a table showing a select logic of the select logic circuit 104 in the floating-point calculator according to the invention shown in FIG. 3. Explained below are operations of the floating-point calculator according to the invention shown in FIG. 3 with reference to FIG. 4.

When exponents Ea, Eb, Ec, Ed, Ee, Ef and fixed-point parts Fa, Fb, Fc, Fd, Fe and Ff of six operands A, B, C, D, E and F are input, the adders 101a, 101b and 101c first perform addition Ea+Eb of the exponents Ea and Eb, addition Ec+Ed of the exponents Ec and Ed, and addition Ee+Ef of the exponents Ee and Ef, respectively, and obtain an exponent ea of the result of multiplication A×B of the operands A and B, exponent eb of the result of multiplication C×D of the operands C and D, and exponent ec of the result of multiplication E×F of the operands E and F, respectively. When the exponents ea, eb and ec are calculated by the adders 101a, 101b and 101c, the subtracters 102a, 102b and 102c perform subtraction ea−eb of the exponents ea and eb, subtraction eb−ec of the exponents eb and ec, and subtraction ec−ea of the exponents ec and ea, respectively, and obtain their subtraction results Dab, Dbc and Dca, and carries Cab, Cbc and Cca. On the other hand, the multipliers 103a, 103b and 103c conduct multiplication Fa×Fb of the fixed-point parts Fa and Fb of the operands A and B, multiplication Fc×Fd of the fixed-point parts Fc and Fd of the operands C and D, and multiplication Fe×Ff of the fixed-point parts Fe and Ff of the operands E and F, and obtain their multiplication results fa, fb and fc, respectively.

Subsequently, according to the select logic shown in FIG. 4, the select logic circuit 104 generates a select signal for selecting the maximum value from the exponents ea, eb and ec and selectively carrying the multiplication results fa, fb and fc by the multipliers 103a, 103b and 103c, based on the carries Cab, Cbc and Cca obtained by subtraction by the subtracters 102a, 102b and 102c. That is, for example, when carry (Cab, Cbc, Cca)=(0, 1, 1) or (0, 0, 1), the select logic is Cab and /Cca (where the symbol "/" before the logic symbol means logic reversal). In this case, the exponent having the maximum value is ea, and multiplication result fixed-point parts selected as the selective carry object fixed-point parts f1, f2 and f3 are fa, fb and fc, and numbers of digits S1 and S2 are Dca, Dab. When carry (Cab, Cbc, Cca)=(1, 0, 1) or (1, 0, 0), the select logic is Cab and /Cbc. In this case, the exponent having the maximum value is eb, and multiplication result fixed-point parts selected as the selective carry object fixed-point parts f1, f2 and f3 are fb, fc and fa, and numbers of digits S1 and S2 are Dab and Dbc, respectively. When carry (Cab, Cbc, Cca)=(1, 1, 0) or (0, 1, 0), the select logic is Cbc and /Cca. In this case, the maximum value exponent is ec, and multiplication result fixed-point parts selected as the selective carry object fixed-point parts f1, f2 and f3 are fc, fa, and fb, and number of digits S1 and S2 are Dbc and Dca, respectively. This select logic can be realized by using an AND logic circuit so configured that one of carries is directly input to one of its inputs, and one of carries is input in the inverted form to the other input thereof, and overhead does not occur. Based on the select signal from the select logic circuit 104, the maximum value selecting circuit 105 selects the maximum value among the exponents ea, eb and ec, the carry object selecting circuits 106a, 106b and 106c select multiplication results fa, fb and fc by the multipliers 103a, 103b and 103c as selective carry object fixed-point parts f1, f2 and f3 in the order from the largest number of digits, and the number-of-digits selecting circuits 107a and 107b select numbers of digits S1 and S2 of selective carry for the second and the third in size of digits among the selective carry object fixed-point parts f1, f2 and f3 from Dab, Dbc and Dca. The negative number of digits S2 selected by the number-of-digits selecting circuit 107b is inverted by the inverter 108 to be the complement on 2.

Then, the number of digits of the selective carry object fixed-point part f2 selected by the carry object selecting circuit 106b is carried by the digit adjusting shifter 109 by the number of digits S1 selected by the number-of-digits selecting circuit 107a. Additionally, the number of digits of the selective carry object fixed-point part f3 selected by the carry object selecting circuit 106c is carried by the digit adjusting shifter 110 by the number of digits inverted from the negative number of digits S2 selected by the number-of-digits selecting circuit 107b to change it to the complement on 2. Further, the number of digits of the selective carry object fixed-point part f3 adjusted in digit is shifted right by another 1 by the shifter 111. After that, the number of preceding zeros in the addition results of the selective carry object fixed-point parts f1, f2 and f3 adjusted in digit is counted by the preceding zero detecting circuit 112, and the exponent correction value En for normalization of the operation result is obtained. At the same time, addition of the selective carry object fixed-point parts f1, f2 and f3 adjusted in digit is executed by the adder 113.

Finally, the subtracter 114 subtracts the exponent correction value En from the maximum value selected from the exponents ea, eb and ec, and an exponent Er of the normalized operation result is obtained; and the normalization shifter 115 performs digit adjustment for normalization of the addition result of the adder 113, based on the exponent correction value En, and a fixed-point part Fr of the operation result is obtained. Having obtained the exponent Er and the fixed-point part Fr means that the operation result of A×B+C×D+E×F has been obtained. Therefore, three-dimensional products can be calculated at the same time by executing this operation A×B+C×D+E×F.

Figure 5:
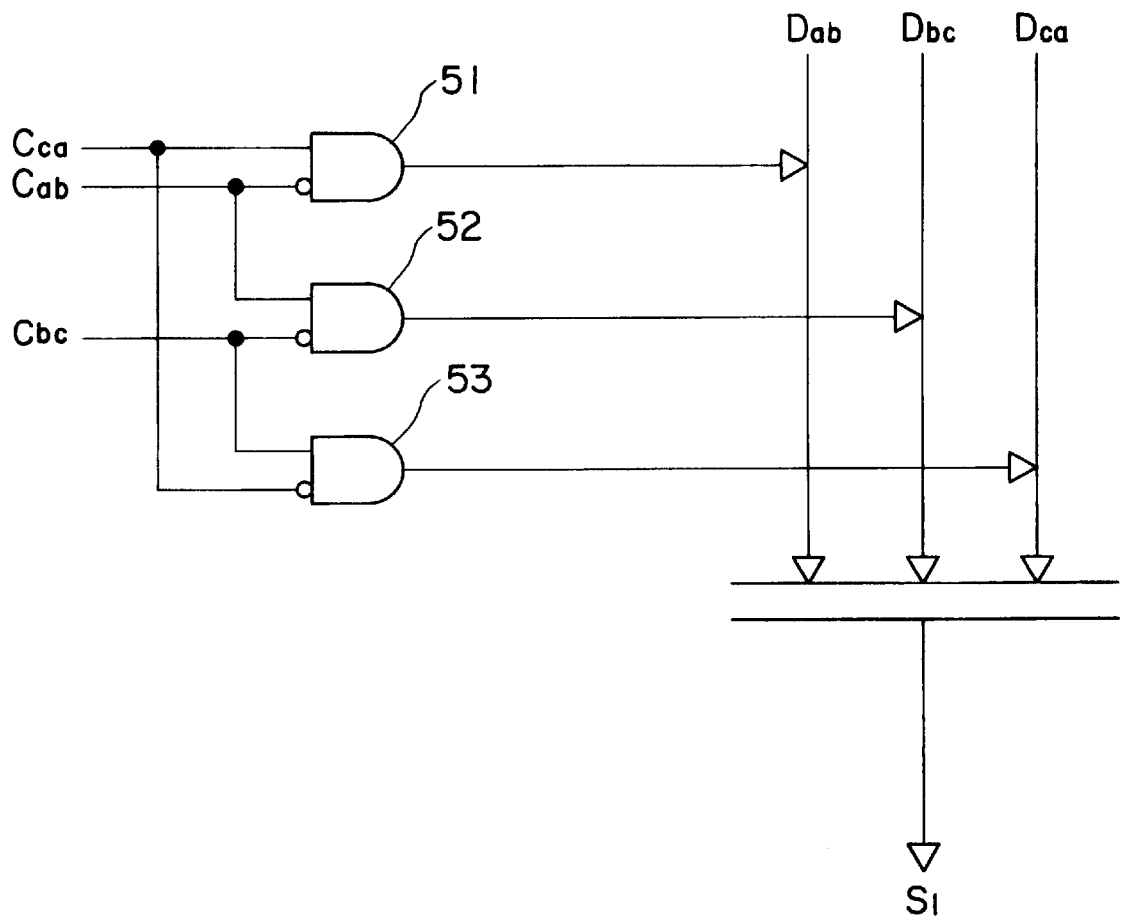
FIG. 5 is a block diagram showing concrete configuration of the select logic circuit 104 in the floating-point calculator according to the invention shown in FIG. 3.

FIG. 5 is a block diagram showing concrete configuration of the select logic circuit 104 in the floating-point calculator according to the invention shown in FIG. 3.

The select logic circuit shown in FIG. 5 includes a first 2-input AND logic gate 51 supplied with the carry Cca to one of the inputs and supplied with the carry Cab in the inverted form to the other input; a second 2-input AND logic gate 52 supplied with the carry Cbc to one of the inputs and supplied with the carry Cbc in the inverted form to the other input; and a third 2-input AND gate 53 supplied with the carry Cbc to one of the inputs and supplied with the carry Cca to the other input.

The select logic circuit is used for realizing the select logic shown in FIG. 4, output signals of the first, second and third AND logic gates 51, 52 and 53 are input to the maximum value selecting circuit 105, carry object selecting circuits 106a, 106b, 106b, and number-of-digits selecting circuits 107a and 107b. Then, according to the select logic, the maximum value is selected from the exponents ea, eb and ec, multiplication results fa, fb and fc are selected as selective carry object fixed-point parts f1, f2 and f3 in the order from one having the largest number of digits, and numbers of digits S1 and S2 for selective carry are selected from Dab, Dbc and Dca.

For example, although FIG. 5 shows the select logic circuit 104 and the number-of-digits selecting circuit 107a, one of three output signals from the first, second and third AND logic gates 51, 52 and 53 becomes "1", and the other two become "o". Therefore, one of transmission paths supplied with the output signal "1" switches to be conductive, and one of Dab, Dbc and Dca is transmitted through the path is output.

Figure 1:
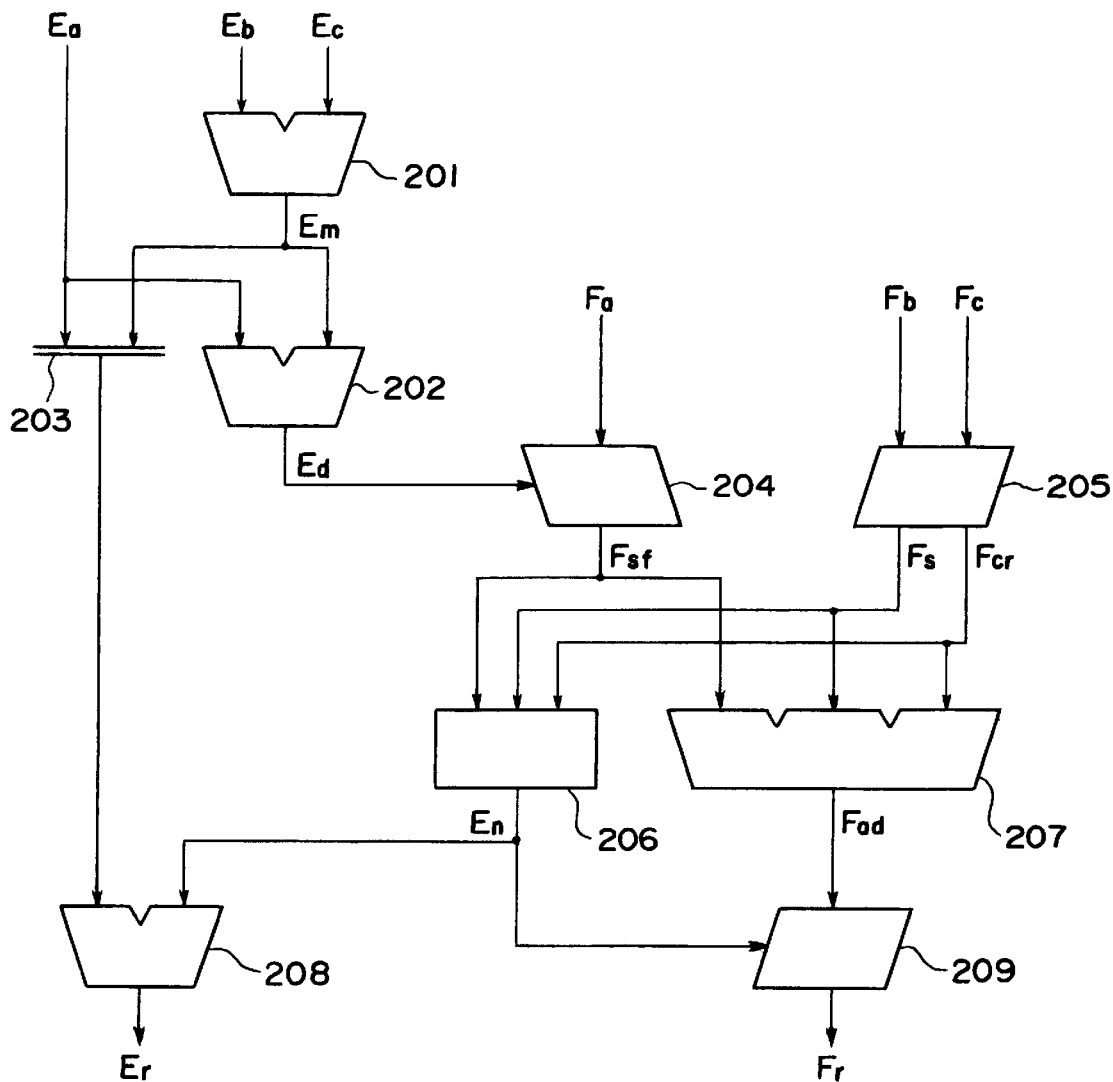
FIG. 1 is a block diagram showing the first example of configuration of a conventional floating-point calculator.
Figure 2:
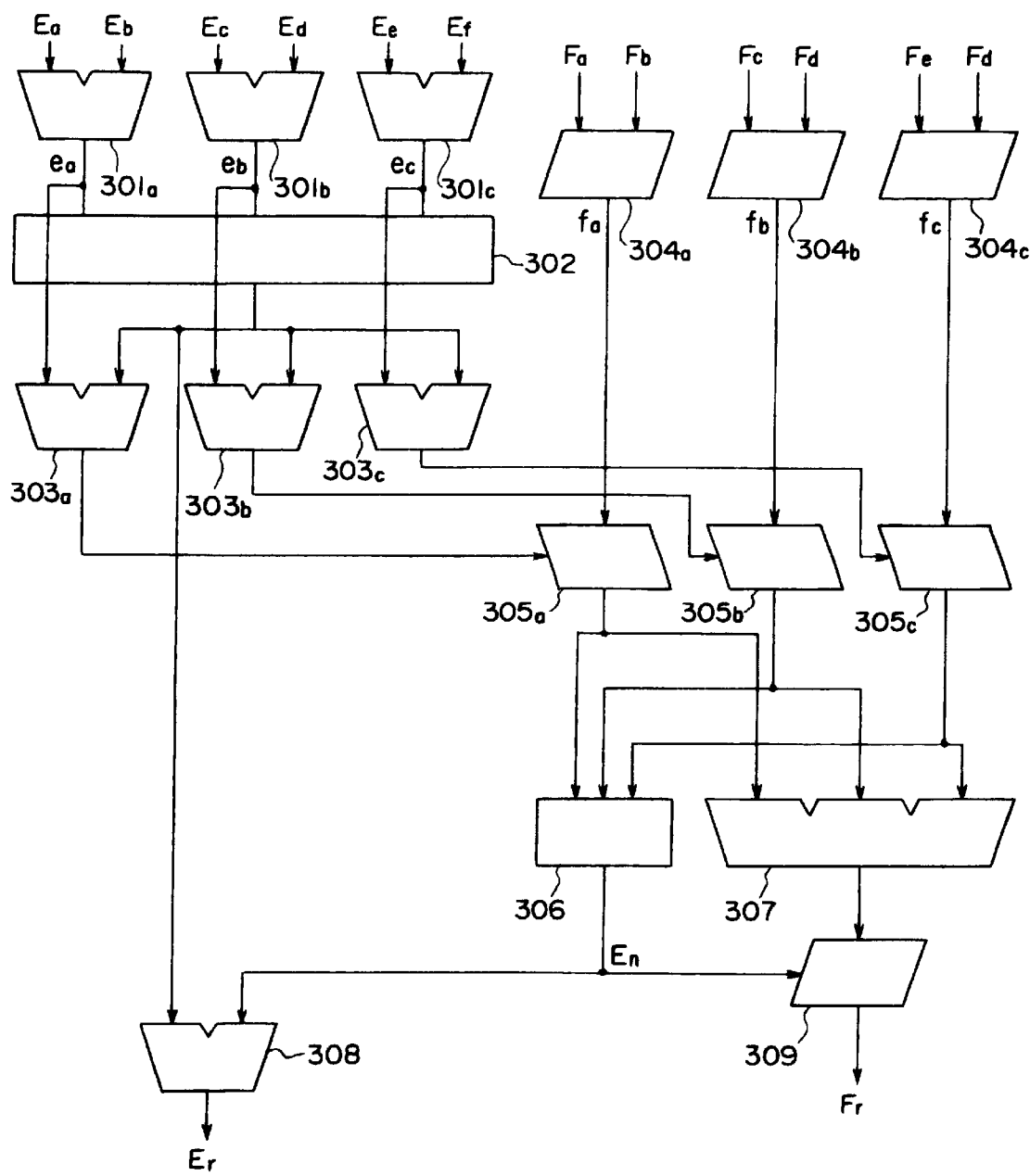
FIG. 2 is a block diagram showing the second example of configuration of another conventional floating-point calculator.

As explained above, in the floating-point calculator according to the invention, unlike the conventional floating-point calculator shown in FIG. 2, since the maximum value of three exponents ea, eb and ec is obtained by using carries Cab, Cbc and Cca obtained by subtraction combining three exponents ea, eb and ec., the select logic is simplified. Additionally, since digit adjustment shifting can be executed just after obtaining a result of the select logic, its operation speed can be increased. As a result, hardware resources such as shift circuits and size comparing circuits, for example, can be reduced.

FIG. 6 is a block diagram showing configuration of a floating-point calculator taken as another embodiment of the invention. In this embodiment, the floating-point calculator according to the invention is configured to execute operation A×B+C×D+E×F+G×H of eight operands A, B, C, D, E, F, G and H more quickly by using less hardware resources. In this example, let these eight operands A, B, C, D, E, F, G and H have exponents Ea, Eb, Ec, Ed, Ee, Ef, Eg, Eh and fixed-point parts Fa, Fb, Fc, Fd, Fe, Ff, Fg and Fh. Four-dimensional inner products can be calculated at the same time by executing this operation A×B+C×D+E×F+G×H.

The floating-point calculator according to the invention shown in FIG. 6 includes: an adder 101a for adding the component Ea of the operand A and the exponent Eb of the operand B, and obtaining an exponent ea of the result of multiplication A×B of the operands A and B; an adder 101b for adding the component Ec of the operand C and the exponent Ed of the operand D, and obtaining an exponent eb of the result of multiplication C×D of the operands C and D; an adder 101c for adding the component Ee of the operand E and the exponent Ef of the operand F, and obtaining an exponent ec of the result of multiplication E×F of the operands E and F; an adder 101d for adding the component Eg of the operand G and the exponent Eh of the operand H, and obtaining an exponent ed of the result of multiplication G×H of the operands G and H; a subtracter 102a for subtracting the exponent eb from the exponent ea and obtaining the subtraction result Dab and a carry Cab; a subtracter 102b for subtracting the exponent ec from the exponent eb and obtaining the subtraction result Dbc and a carry Cbc; a subtracter 102c for subtracting the exponent ed from the exponent ec and obtaining the subtraction result Dcd and a carry Ccd; a subtracter 102d for subtracting the exponent ea from the exponent ed and obtaining the subtraction result Dda and a carry Cda; a subtracter 102e for subtracting the exponent ec from the exponent ea and obtaining the subtraction result Dac and a carry Cac; a subtracter 102f for subtracting the exponent ed from the exponent eb and obtaining the subtraction result Dbd and a carry Cbd; a multiplier 103a for multiplying the fixed-point part Fa of the operand A and the fixed-point part Fb of the operand B and obtaining its multiplication result fa; a multiplier 103b for multiplying the fixed-point part Fc of the operand C and the fixed-point part Fd of the operand D and obtaining its multiplication result fb; a multiplier 103c for multiplying the fixed-point part Fe of the operand F and the fixed-point part Ff of the operand F and obtaining its multiplication result fc; a multiplier 103d for multiplying the fixed-point part Fg of the operand G and the fixed-point part Fh of the operand H and obtaining its multiplication result fd; a select logic circuit 104 for generating a select signal for selecting the maximum value from the exponents ea, eb, ec and ed and selectively carrying the multiplication results fa, fb, fc and fd by the multipliers 103a, 103b, 103c and 103c on the basis of the carries Cab, Cbc, Ccd, Cda, Cac and Cbd obtained by subtraction of by the subtracters 102a, 102b, 102c, 102d, 102e and 102f; a maximum value selecting circuit 105 responsive to the select signal from the select logic circuit 104 to select the maximum value from the exponents ea, eb, ec and ed; carry object selecting circuit 106a for selecting one of the multiplication results fa, fb, fc and fd by the multipliers 103a, 103b, 103c and 103d as a selective carry object fixed-point part f1 which has the exponent having the maximum value among the exponents ea, eb, ec and ed on the basis of the select signal from the select logic circuit 104; carry object selecting circuits 106b, 106c and 106d for selecting multiplication results fa or fb, fb or fc, fd or fa except the multiplication result fa, fb, fc or fd selected as the selective carry object fixed-point part f1 as selective carry object fixed-point parts f2, f3 and f4 on the basis of the select signal from the select logic circuit 104; number-of-digits selecting circuits 107a, 107b and 107c for selecting numbers of digits S1, S2 and S1 for selective carry for a selective carry object fixed-point part whose number of digits is the second from the largest, a selective carry object fixed-point part whose number of digits is the third from the largest, and a selective carry object fixed-point part whose number of digits is the fourth from the largest, among f1, f2, f3 and f4, from Dab, Dbc, Dcd, Dda, Dac, Dbd, /Dab, /Dbc, /Dcd, /Dda, /Dac and /Dbd, on the basis of the select signal from the select logic circuit 104; digit adjusting shifters 109, 110 and 111 for carrying the numbers of digits of the selective carry object fixed-point parts f2, f3 and f4 selected by the carry object selecting circuits 106b, 106c and 106d by the numbers of digits S1, S2 and S3 selected by the number-of-digits selecting circuits 107a, 107b and 107c; shifters 116, 117 and 118 for shifting the numbers of digits of the selective carry object fixed-point parts f2, f3 and f4 after digit adjustment to the right by another 1; a preceding zero detecting circuit 112 for counting the number of preceding zeros in the addition result of the selective carry object fixed-point parts f1, f2, f3 and f4 after digit adjustment, and obtaining an exponent correction value En for normalization of operation results; an adder 113 for effecting addition of the selective carry object fixed-point parts f1, f2, f3 and f4 after digit adjustment; a subtracter 114 for subtracting the exponent correction value En from the maximum value of the exponents ea, eb, ec and ed, and obtaining an exponent Er of a normalized operation result; and a normalization shifter 115 for effecting digit adjustment for normalization of the addition result of adder 113 and obtaining a fixed-point part Fr as the operation result.

FIG. 7 is a table showing a select logic of the select logic circuit 104 in the floating-point calculator according to the invention shown in FIG. 6. Explained below are operations of the floating-point calculator according to the invention shown in FIG. 6 with reference to FIG. 7.

When exponents Ea, Eb, Ec, Ed, Ee, Ef, Eg, Eh and fixed-point parts Fa, Fb, Fc, Fd, Fe, Ff, Fg and Fh of eight operands A, B, C, D, E, F, G and H are input, the adders 101a, 101b, 101c and 101d first perform addition Ea+Eb of the exponents Ea and Eb, addition Ec+Ed of the exponents Ec and Ed, addition Ee+Ef of the exponents Ee and Ef, and addition Eg+Eh of the exponents Eg and Eh, respectively, and obtain an exponent ea of the result of multiplication A×B of the operands A and B, exponent eb of the result of multiplication C×D of the operands C and D, exponent ec of the result of multiplication E×F of the operands E and F, and exponent ed of the result of multiplication G×H of the operands G and H, respectively. When the exponents ea, eb, ec and ed are calculated by the adders 101a, 101b, 101c and 101d, the subtracters 102a, 102b, 102c, 102d, 102e and 102f perform subtraction ea−eb of the exponents ea and eb, subtraction eb−ec of the exponents eb and ec, subtraction ec−ed of the exponents ec and ed, subtraction ed−ea of the exponents ed and ea, subtraction ea−ec of the exponents ea and ec and subtraction eb−ed of the exponents eb and ed, respectively, and obtain their subtraction results Dab, Dbc, Dcd, Dda, Dac and Dbd and carries Cab, Cbc, Ccd, Cda, Cad and Cbd, respectively. At the same time, the multipliers 103a, 103b, 103c and 103d conduct multiplication Fa×Fb of the fixed-point parts Fa and Fb of the operands A and B, multiplication Fc×Fd of the fixed-point parts Fc and Fd of the operands C and D, multiplication Fe×Ff of the fixed-point parts Fe and Ff of the operands E and F, and multiplication Fg×Fh of the fixed-point parts Fg and Fh of the operands G and H, and obtain their multiplication results fa, fb, fc and fd, respectively.

Subsequently, according to the select logic shown in FIG. 7, the select logic circuit 104 generates a select signal for selecting the maximum value from the exponents ea, eb, ec and ed and selectively carrying the multiplication results fa, fb, fc and fd by the multipliers 103a, 103b, 103c and 103d, based on the carries Cab, Cbc, Ccd, Cda, Cac and Cbd obtained by subtraction by the subtracters 102a, 102b, 102c and 102d. That is, for example, when carry (Cab, Cbc, Ccd, Cda, Cac, Cbd)=(0, 0, 0, 1, 0, 0), the select logic is /Cab and Cda and /Cbd. In this case, the exponent having the maximum value is ea, and multiplication result fixed-point parts selected as the selective carry object fixed-point parts f1, f2, f3 and f4 are fa, fb, fc and fd, and numbers of digits S1, S2 and S3 are Dab, Dac, /Dda, respectively. This select logic can be realized by using a 3-input AND logic circuit, and overhead does not occur. Based on the select signal from the select logic circuit 104, the maximum value selecting circuit 105 selects the maximum value among the exponents ea, eb, ec and ed, the carry object selecting circuit 106a selects one of the multiplication results fa, fb, fc and fd by the multipliers 103a, 103b, 103c and 103d as a selective carry object fixed-point part f1 which has the exponent having the maximum value among the exponents ea, eb, ec and ed, the carry object selecting circuits 106b, 106c and 106d select multiplication results fa or fb, fb or fc, fd or fa except the multiplication result fa, fb, fc or fd selected as the selective carry object fixed-point part f1 as selective carry object fixed-point parts f2, f3 and f4, and the number-of-digits selecting circuits 107a, 107b and 107c select numbers of digits S1, S2 and S3 of selective carry for the selective carry object fixed-point parts f2, f3 and f4 from Dab, Dbc, Dcd, Dda, Dac, Dbd, /Dab, Dbc, /Dda, /Dda, /Dac and /Dbd.

Then, the numbers of digits of the selective carry object fixed-point parts f2, f3 and f4 selected by the carry object selecting circuits 106b, 106c and 106d are carried by the digit adjusting shifters 109, 110 and 111 by the numbers of digits S1, S2 and S3 selected by the number-of-digits selecting circuits 107a, 107b and 107c. Further, the numbers of digits of the selective carry object fixed-point parts f2, f3 and f4 adjusted in digit are shifted right by 1 by the shifter 111 only when /Dab, Dbc, /Dda, /Dda, /Dac or /Dbd is selected. After that, the number of preceding zeros in the addition results of the selective carry object fixed-point parts f1, f2, f3 and f4 adjusted in digit is counted by the preceding zero detecting circuit 112, and the exponent correction value En for normalization of the operation result is obtained. At the same time, addition of the selective carry object fixed-point parts f1, f2, f3 and f4 adjusted in digit is executed by the adder 113.

Finally, the subtracter 114 subtracts the exponent correction value En from the maximum value selected from the exponents ea, eb, ec and ed, and an exponent Er of the normalized operation result is obtained; and the normalization shifter 115 performs digit adjustment for normalization of the addition result of the adder 113, based on the exponent correction value En, and a fixed-point part Fr of the operation result is obtained. Having obtained the exponent Er and the fixed-point part Fr means that the operation result of A×B+C×D+E×F+G×H has been obtained.

Therefore, four-dimensional products can be calculated at the same time by executing this operation A×B+C×D+E×F+G×H.

Figure 8:
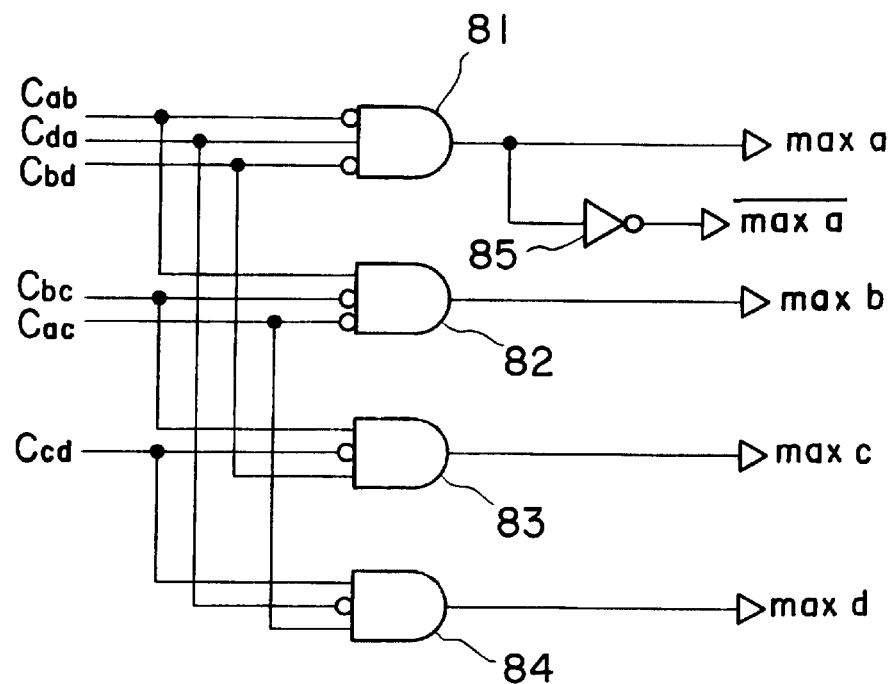
FIG. 8 is a block diagram showing concrete configuration of the select logic circuit 104 in the floating-point calculator according to the invention shown in FIG. 6.

FIG. 8 is a block diagram showing concrete configuration of the select logic circuit 104 in the floating-point calculator according to the invention shown in FIG. 36

The select logic circuit shown in FIG. 8 includes a first 3-input AND logic gate 81 supplied with the carry Cab, inverted, to a first input, the carry Cda to a second input and the carry Cbd, inverted, to a third input; a second 3-input AND logic gate 82 supplied with the carry Cab to a first input, the carry Cbc, inverted, to a second input and the carry Cac, inverted, to a third input; a third 3-input AND logic gate 83 supplied with the carry Cbc to a first input, the carry Ccd, inverted, to a second input and the carry Cbd, inverted, to a third input; a fourth 3-input AND logic gate 84 supplied with the carry Ccd, inverted, to a first input, the carry Cda, inverted, to a second input and the carry Cac to a third input; and an inverter 85 for inverting the output signal from the first 3-input AND logic gate 81.

The select logic circuit is used for realizing the select logic shown in FIG. 7, output signals maxa, maxb, maxc and maxd of the first, second, third and fourth AND logic gates 81, 82, 83 and 84 are input to the maximum value selecting circuit 105, carry object selecting circuit 106a, and number-of-digits selecting circuits 107a, 107b and 107c.

Additionally, the output signal maxa from the first 3-input AND gate 81 and its inverted output signal /maxa are input to the carry object selecting circuits 106b, 106c and 106d, respectively. Then, according to the select logic, the maximum value is selected from the exponents ea, eb and ec, multiplication results fa, fb, fc and fd are selected as selective carry object fixed-point parts f1, f2, f3 and f4 in the order from one having the largest number of digits, and numbers of digits S1, S2 and S3 for selective carry are selected from the subtraction results Dab, Dbc, Dcd, Dda, Dac, Dbd, /Dab, /Dbc, /Dca, /Dda, /Dac and /Dbd.

Figure 9A:
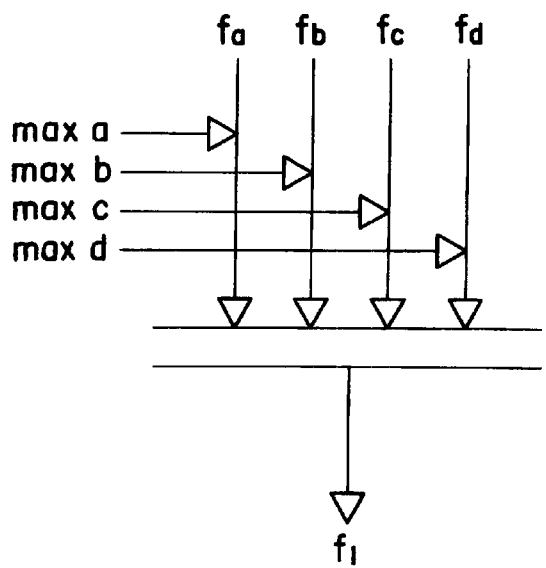
FIG. 9A is a connection diagram showing relative connection of the select logic circuit 104 to a carry object selecting circuit 106a, FIG. 9B is a connection diagram showing relative connection of the select logic circuit 104 to a carry object selecting circuit 106b.
Figure 9B:
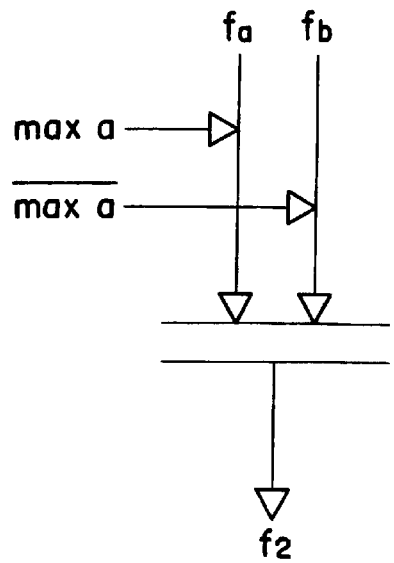
FIG. 9C is a connection diagram showing relative connection of the select logic circuit 104 to a number-of-digits selecting circuit 107a, FIG. 9D is a connection diagram showing relative connection of the select logic circuit 104 to a number-of-digits selecting circuit 107b.
FIG. 9E is a connection diagram showing relative connection of the select logic circuit 104 to a number-of-digits selecting circuit 107c.
Figure 9C:
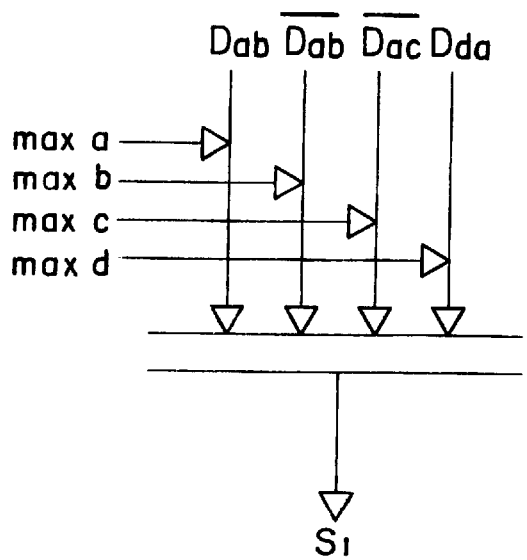
Figure 9D:
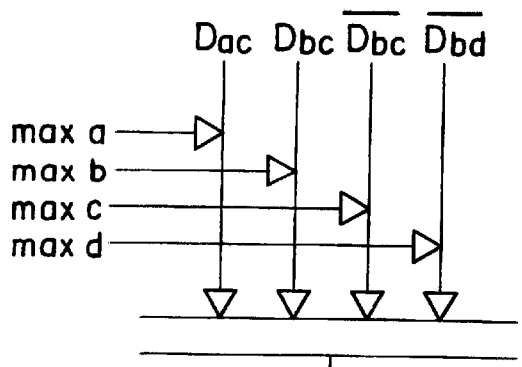
Figure 9E:
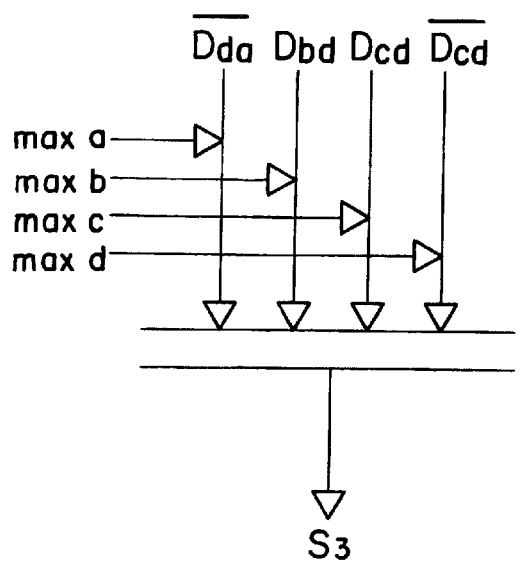

FIG. 9A is a connection diagram showing relative connection of the select logic circuit 104 to a carry object selecting circuit 106a, FIG. 9B is a connection diagram showing relative connection of the select logic circuit 104 to a carry object selecting circuit 106b, FIG. 9C is a connection diagram showing relative connection of the select logic circuit 104 to a number-of-digits selecting circuit 107a, FIG. 9D is a connection diagram showing relative connection of the select logic circuit 104 to a number-of-digits selecting circuit 107b, and FIG. 9E is a connection diagram showing relative connection of the select logic circuit 104 to a number-of-digits selecting circuit 107c.

Shown in FIG. 9A are four output signals maxa, maxb, maxc and maxd of the select logic circuit 104, and the carry object selecting circuit 106a. One of these four output signals maxa, maxb, maxc and maxd becomes "1", and the others become "0". Therefore, one of transmission paths supplied with the output signal "1" switches to be conductive, and one of the multiplication results fa, fb, fc and fd is transmitted through the path is output.

Shown in FIG. 9B are the output signal maxa from the first 3-input AND logic gate 81 of the select logic circuit 104, its inverted output signal /maxa and carry object selecting circuit 106b. one of the output signal maxa and the inverted output signal /maxa becomes "1", and the other becomes "0". Therefore, one of transmission paths supplied with the output signal "1" switches to be conductive, and one of the multiplication results fa and fb is transmitted through the path is output. Also the carry object selecting circuits 106c and 106d have the same connection, and executes the same operation.

Shown in FIG. 9C are four output signals maxa, maxb, maxc and maxd of the select logic circuit 104 and the number-of-digit selecting circuit 107a. One of these four output signals maxa, maxb, maxc and maxd become "1", and the other three become "0". Therefore, one of transmission paths for the subtraction results Dab, Dda /Dab and /Dac supplied with the output signal "1" switches to be conductive, and one of Dab, Dda /Dab and /Dac is transmitted through the path is output.

Shown in FIG. 9D are four output signals maxa, maxb, maxc and maxd of the select logic circuit 104 and the number-of-digit selecting circuit 107b. One of these four output signals maxa, maxb, maxc and maxd become "1", and the other three become "0". Therefore, one of transmission paths for the subtraction results Dbc, Dac, /Dbc and //Dbd supplied with the output signal "1" switches to be conductive, and one of Dbc, Dac, /Dbc and /Dbd is transmitted through the path is output.

Shown in FIG. 9E are four output signals maxa, maxb, maxc and maxd of the select logic circuit 104 and the number-of-digit selecting circuit 107c. One of these four output signals maxa, maxb, maxc and maxd become "1", and the other three become "0". Therefore, one of transmission paths for the subtraction results Dcd, Dbd, /Dcd and /Dda supplied with the output signal "1" switches to be conductive, and one of the subtraction results Dcd, Dbd, /Dcd and /Dda is transmitted through the path is output.

Although inner products calculator have been explained in the foregoing embodiments, the subject matter of the invention lies in the configuration regarding selection of the maximum value of exponents and digit adjusting processing, and specific devices for the other processing of multiplication and addition can be modified adequately.

According to the floating-point calculator proposed by the invention, since the select logic is simplified, and digit adjustment shifting can be executed soon after obtaining the select logic, its operation speed can be increased, and hardware resources such as shift circuits and size comparing circuits, for example, can be reduced.

What is claimed is:

1. A floating-point calculator comprising:

an exponent part calculator device which executes subtraction by sequentially combining respective pair of exponents of a plurality of operands, and obtains subtraction result exponents of respective combinations to be used as alternatives for the number of digits for digit adjustment of fixed-point parts of said operands and carries of said subtraction, respectively;

a maximum value selector device responsive to values of said carries to select one of the results of the combining having the maximum value;

a digit adjustment object selector device responsive to values of said carries to select a fixed-point part of said operands to be adjusted in digit; and a digit adjustment number-of-digits selector device responsive to values of said carries to select one of said subtraction result exponents to be used as said number of digits for digit adjustment of said fixed-point part of said operand to be adjusted in digit.

2. A floating-point calculator comprising:

an exponent part adder device which sequentially executes addition of every combined two of exponents of a plurality of operands, and obtains addition result exponents of respective combinations;

a fixed-point part multiplier device which sequentially executes multiplication of every combined two of fixed-point parts of said operands and obtains multiplication result fixed-point parts of respective combinations;

an exponent part subtracter device which executes subtraction by sequentially combining said addition result exponents and obtains subtraction result exponents of respective combinations to be used as alternatives for the number of digits for digit adjustment of said multiplication result fixed-point parts and carries of said subtraction, respectively;

a maximum value selector device responsive to values of said carries to select one of said addition result exponents having the maximum value;

a digit adjustment object selector device responsive to values of said carries to select said multiplication result fixed-point part to be adjusted in digit;

a digit adjustment number-of-digits selector device responsive to values of said carries to select one of said subtraction result exponents to be used as said number of digits for digit adjustment of said multiplication result fixed-point part to be adjusted in digit;

a digit adjuster device for digit adjustment of said multiplication result fixed-point part by using said selected subtraction result component;

a fixed-point part adder device for executing addition of said multiplication result fixed-point parts adjusted in digit to obtain an addition result fixed-point part;

a preceding zero detector device for executing addition of said multiplication result fixed-point parts adjusted in digit, then counting the number of preceding zeros in the addition result fixed-point part obtained, and obtaining a normalization exponent for normalization of the operation result;

a normalization operation result exponent calculator device for subtracting said normalization exponent from one of said addition result exponents having the maximum value, and obtaining a normalized operation result exponent; and a normalization operation result fixed-point part calculator device responsive to said normalization exponent to perform digit adjustment for normalization of said addition result fixed-point part and obtaining an operation result fixed-point part.

3. A floating-point calculator comprising:

an exponent part adder device which sequentially executes addition of every combined two of exponents of an even number of operands, and obtains addition result exponents of respective combinations;

a fixed-point part multiplier device which sequentially executes multiplication of every combined two of fixed-point parts of an even number of operands and obtains multiplication result fixed-point parts of respective combinations;

an exponent part subtracter device which executes subtraction by sequentially combining said addition result exponents and obtains subtraction result exponents of respective combinations to be used as alternatives for the number of digits for digit adjustment of said multiplication result fixed-point parts and carries of said subtraction, respectively;

a maximum value selector device responsive to values of said carries to select one of said addition result exponents having the maximum value;

a digit adjustment object selector device responsive to values of said carries to select said multiplication result fixed-point part to be adjusted in digit;

a digit adjustment number-of-digits selector device responsive to values of said carries to select one of said subtraction result exponents to be used as said number of digits for digit adjustment of said multiplication result fixed-point part to be adjusted in digit;

a digit adjuster device for digit adjustment of said multiplication result fixed-point part by using said selected subtraction result component;

a fixed-point part adder device for executing addition of said multiplication result fixed-point parts adjusted in digit to obtain an addition result fixed-point part;

a preceding zero detector device for executing addition of said multiplication result fixed-point parts adjusted in digit, then counting the number of preceding zeros in the addition result fixed-point part obtained, and obtaining a normalization exponent for normalization of the operation result;

a normalization operation result exponent calculator device for subtracting said normalization exponent from one of said addition result exponents having the maximum value, and obtaining a normalized operation result exponent; and a normalization operation result fixed-point part calculator device responsive to said normalization exponent to perform digit adjustment for normalization of said addition result fixed-point part and obtaining an operation result fixed-point part.

4. A floating-point calculator comprising:

first, second and third adders which execute addition of an exponent of a first operand and an exponent of a second operand, addition of an exponent of a third operand and an exponent of a fourth operand, and addition of an exponent of a fifth operand and an exponent of a sixth operand, thereby to obtain first, second and third addition result exponents;

first, second and third subtracters which execute subtraction of said second addition result exponent from said first addition result exponent, subtraction of said third addition result exponent from said second addition result exponent, and subtraction of said first addition result exponent from said third addition result exponent, thereby to obtain first, second and third subtraction result exponents and carries;

first, second and third multipliers which execute multiplication of a fixed -point part of the first operand and a fixed-point part of the second operand, multiplication of a fixed-point part of the third operand and a fixed-point part of the fourth operand, and multiplication of a fixed-point part of the fifth operand and a fixed-point part of the sixth operand, thereby to obtain first, second and third multiplication result fixed-point parts;

a select logic circuit responsive to said first, second and third carries to generate a select signal for selection of one of said first, second and third addition result exponents having the maximum value and selective digit adjustment of said first, second and third multiplication result fixed-point parts; a maximum value selecting circuit responsive to said select signal to select one of said first, second and third addition result exponents having the largest value;

first, second and third digit adjustment object selecting circuits responsive to said select signal to select said first, second and third multiplication result fixed-point parts as selective digit adjustment object fixed-point parts as first, second and third selective digit adjustment object fixed-point parts, respectively, in the order from one having the largest number of digits;

first and second number-of-digits selecting circuits which select, from said first, second and third subtraction result exponents, first and second numbers of digits for selective digit adjustment of one and another of said first, second and third selective digit adjustment object fixed-point parts, which have numbers of digits that are the second and the third from the largest, in response to said select signal;

a logic inverter circuit which inverts the negative said second number of digits selected by said second number-of-digits selecting circuit to change it to the complement on 2;

a first digit adjusting shifter for digit adjustment of the number of digits of said second selective digit adjustment object fixed-point part by said first number of digits;

a second digit adjusting shifter for digit adjustment of the number of digits of said third selective digit adjustment object fixed-point part by the number of digits inverted from said second number of digits;

a third digit adjusting shifter for digit adjustment of the number of digits of said third selective digit adjustment object fixed-point part already adjusted in digit by another 1 to the right;

a fourth adder which executes addition of said first, second and third selective digit adjustment objection fixed-point parts already adjusted in digit, thereby to obtain an addition result fixed-point part;

a preceding zero detecting circuit which executes addition of said first, second and third selective digit adjustment object fixed-point parts already adjusted in digit, then calculates the number of preceding zeros in the addition result fixed-point part obtained, and calculates a normalization exponent for normalization of the operation result;

a fourth subtracter which subtracts said normalization exponent from one of said first, second and third addition result exponents having the maximum value thereby to obtain a normalized operation result exponent; and a normalization shifter which conducts digit adjustment for normalization of said addition result fixed-point part in accordance with said normalization exponent.

5. The floating-point calculator according to claim 4 wherein said select logic circuit includes:

a first 2-input AND logic gate supplied with the third carry to one of input thereof and the first carry in an inverted form to the other input thereof;

a second 2-input AND logic gate supplied with the first carry in an inverted form to one of input thereof and the second carry to the other input thereof; and a third 2-input AND logic gate supplied with the second carry to one of inputs thereof and the third carry in an inverted form to the other input thereof.

6. A floating-point calculator comprising:

first, second, third and fourth adders which execute addition of an exponent of a first operand and an exponent of a second operand, addition of an exponent of a third operand and an exponent of a fourth operand, addition of an exponent of a fifth operand and an exponent of a sixth operand, and addition of an exponent of a seventh operand and an exponent of an eighth operand, thereby to obtain first, second, third and fourth addition result exponents;

first, second, third, fourth, fifth and sixth subtracters which execute subtraction of said second addition result exponent from said first addition result exponent, subtraction of said third addition result exponent from said second addition result exponent, subtraction of said fourth addition result exponent from said third addition result exponent, subtraction of said first addition result exponent from said fourth addition result exponent, subtraction of said third addition result exponent from said first addition result exponent, and subtraction of said fourth addition result exponent from said second addition result exponent, thereby to obtain first, second, third, fourth, fifth and sixth subtraction result exponents and carries;

first, second, third and fourth multipliers which execute multiplication of a fixed-point part of the first operand and a fixed-point part of the second operand, multiplication of a fixed-point part of the third operand and a fixed-point part of the fourth operand, multiplication of a fixed-point part of the fifth operand and a fixed-point part of the sixth operand, and multiplication of a fixed-point part of the seventh operand and a fixed-point part of the eighth operand thereby to obtain first, second, third and fourth multiplication result fixed-point parts;

a select logic circuit responsive to said first, second, third, fourth, fifth and sixth carries to generate a select signal for selection of one of said first, second, third and fourth addition result exponents having the maximum value and selective digit adjustment of said first, second, third and fourth multiplication result fixed-point parts;

a maximum value selecting circuit responsive to said select signal to select one of said first, second, third and fourth addition result exponents having the largest value;

a first digit adjustment object selecting circuit responsive to said select signal to select one of said first, second, third and fourth multiplication result fixed-point parts as a first selective digit adjustment object fixed-point part which has the exponent having the maximum value among said first, second, third and fourth exponents;

second, third and fourth digit adjustment object selecting circuits responsive to said select signal to select said first or second, said second or third, said third or fourth multiplication result fixed-point parts except said first, second, third, or fourth multiplication result fixed-point part selected as said first selective digit adjustment object fixed-point part as second, third, or fourth selective digit adjustment object fixed-point part;

first, second and third number-of-digits selecting circuits which select, from said first, second, third, fourth, fifth and sixth subtraction result exponents and inverted values of said first, second, third, fourth, fifth and sixth subtraction result exponents, first, second and third numbers of digits for selective digit adjustment of selective digit adjustment object fixed-point parts whose numbers of digits are the second, the third and the fourth from the largest, among said first, second, third and fourth selective digit adjustment object fixed-point parts, in response to said select signal;

first, second and third digit adjusting shifters for digit adjustment of numbers of digits of said second third and fourth selective digit adjustment object fixed-point parts by said first, second and third numbers of digits;

fourth, fifth and sixth digit adjusting shifters for digit adjustment of numbers of digits of said second, third and fourth selective digit adjustment object fixed-point parts already adjusted in digit by another 1 to the right;

a fifth adder which executes addition of said first, second, third and fourth selective digit adjustment objection fixed-point parts already adjusted in digit, thereby to obtain an addition result fixed-point part;

a preceding zero detecting circuit which executes addition of said first, second, third and fourth selective digit adjustment object fixed-point parts already adjusted in digit, then calculates the number of preceding zeros in the addition result fixed-point part obtained, and calculates a normalization exponent for normalization of the operation result;

a seventh subtracter which subtracts said normalization exponent from one of said first, second, third and fourth addition result exponents having the maximum value thereby to obtain a normalized operation result exponent; and a normalization shifter which conducts digit adjustment for normalization of said addition result fixed-point part in accordance with said normalization exponent.

7. The floating-point calculator according to claim 6 wherein said select logic circuit includes:

a first 3-input AND logic gate supplied with said first carry in an inverted form to a first input thereof, said fourth carry to a second input thereof and said sixth carry in an inverted form to a third input thereof, a second 3-input AND logic gate supplied with said first carry to a first input thereof, said second carry in an inverted form to a second input thereof and said fifth carry in an inverted form to a third input thereof;

a third 3-input AND logic gate supplied with said second carry to a first input thereof, said third carry in an inverted form to a second input thereof and said sixth carry to a third input thereof, a fourth 3-input AND logic gate supplied with said third carry to a first input thereof, said fourth carry in an inverted form to a second input thereof and said fifth carry to a third input thereof, and an inverter for inverting the output signal of said first 3-input AND logic gate.

* * * * *